UNITED STATES PATENT OFFICE.

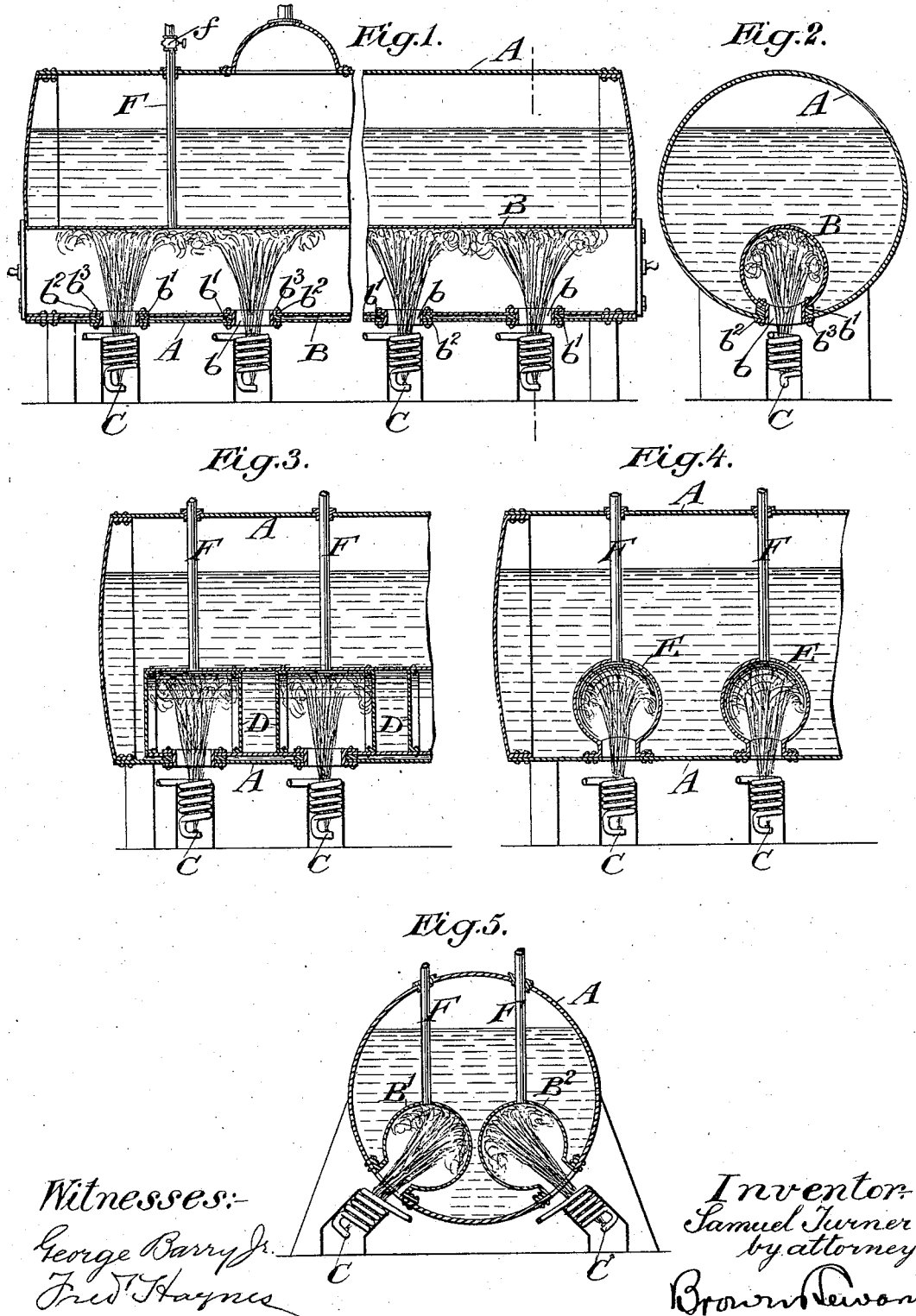

SAMUEL TURNER, OF NEW YORK, N. Y., ASSIGNOR OF ONE-HALF TO CORA L. TURNER, OF SAME PLACE.

STEAM-BOILER.

SPECIFICATION forming part of Letters Patent No. 575,081, dated January 12, 1897.

Application filed December 28, 1895. Serial No. 573,659. (No model.)

*To all whom it may concern:*

Be it known that I, SAMUEL TURNER, of the city and county of New York, in the State of New York, have invented a new and useful Improvement in Steam-Boilers, of which the following is a specification.

My invention relates to an improvement in steam-boilers more particularly adapted to use in connection with gas-jet flames.

A practical embodiment of my invention is represented in the accompanying drawings, in which—

Figure 1 represents the boiler in longitudinal vertical section, broken away centrally for the purpose of showing the drawings upon a larger scale. Fig. 2 is a transverse section. Fig. 3 is a partial longitudinal section showing independent fire-chambers for each jet. Fig. 4 is a partial longitudinal section showing independent fire-chambers of modified form, and Fig. 5 represents in transverse section a form of boiler in which there is a plurality of interior chambers or series of chambers.

In the form represented in Figs. 1 and 2 the outer shell of the boiler is represented by A and is of cylindrical form, as is common. Along its interior in proximity to its casing, but preferably spaced from the casing a distance sufficient to permit the circulation of water between the two, there is located a smaller tubular casing B, closed at its opposite ends, but having its interior in communication with the exterior air through tubular nipples $b$, located at intervals along its side nearest the interior wall of the exterior casing A.

In practice the interior casing B may be spaced from the interior of the casing A by means of annular rings $b'$, which surround the nipples $b$, and the nipples $b$ may be expanded at their opposite ends or otherwise provided with flanges $b^2$, through which rivets $b^3$ may be secured, said rivets passing also through the walls of the interior and exterior casings and through the annular rings $b'$, which surround the nipples.

The burners (denoted by C) are placed in such position that the flame will enter through the nipple $b$ and impinge against the curved interior wall of the tubular casing B. Where the tubular casing B has its interior left open from end to end, as in Figs. 1 and 2, the flames from the successive burners will be permitted to spread toward and contact with each other, making the interior of the casing B a fire-chamber. The heat at the walls of the nipples $b$ will also be intense, and the water surrounding said nipples and in proximity to the same will become heated to a high degree.

In the form shown in Fig. 3 the interior casing B is separated intermediate of the nipples $b$ by hollow bulkheads D, open to the interior of the casing A for the circulation of water between their walls, but closed to the fire-chambers upon their opposite sides.

In the form shown in Fig. 4 the fire-chambers, instead of being formed by an interior tubular casing, are formed independently of one another by means of spherical casings E, having their interiors connected with the exterior air through the exterior casing A in a manner quite similar to that shown in connection with the tubular casing B.

For the purpose of permitting the escape of smoke or unconsumed gases which may accumulate within the fire-chamber during the starting of the burner, the said fire-chamber may have in connection therewith an escape-pipe, such, for example, as that shown at F, the said escape-pipe being provided with a suitable stop-cock $f$ for shutting it off or opening it at pleasure.

The number of nipples $b$ for the reception of jet-flames may be determined by the length and capacity of the boiler.

Instead of a single interior chamber or series of chambers there may be a plurality of such chambers or series of chambers, as indicated in Fig. 5, where two interior tubular chambers $B'$ $B^2$, each with their own line of hollow nipples and burners, are represented.

What I claim is—

1. A boiler comprising an exterior casing for containing a body of water to be heated, a fire-chamber located within the said exterior casing and closed at the opposite ends of the casing and a contracted neck forming a communication between the interior of the fire-chamber and the exterior air for the passage of a heating-flame, substantially as set forth.

2. A boiler comprising an exterior casing for holding a body of water to be heated, a fire-chamber located within and spaced a short distance from the interior of the boiler-casing and closed at the opposite ends of the casing and a contracted neck leading from the interior of the fire-chamber to the exterior air through the said boiler-casing for admitting the heat of the flame, substantially as set forth.

3. A boiler comprising a cylindrical casing for containing a body of water to be heated, an interior tubular fire-chamber extending along the casing in proximity to one side thereof, a conduit leading from the interior of said fire-chamber to the exterior of the casing and a plurality of necks forming communications between the interior of the tubular fire-chamber and the exterior air for admitting the heating-flame, substantially as set forth.

4. A boiler comprising a cylindrical casing for containing a body of water to be heated, a tubular fire-chamber located within the said casing in proximity to one of its sides, a plurality of necks forming connections between the interior of the tubular fire-chamber and the exterior air and bulkheads across the interior of the tubular fire-chamber intermediate of the successive necks, substantially as set forth.

5. A boiler comprising a cylindrical casing for containing a body of water to be heated, a tubular fire-chamber located within the casing and in proximity to one side thereof, a plurality of necks connecting the interior of the fire-chamber with the exterior air and hollow bulkheads across the tubular fire-chamber intermediate of successive necks, the said hollow bulkheads being in communication with the interior of the boiler-casing, substantially as set forth.

SAMUEL TURNER.

Witnesses:
FREDK. HAYNES,
GEORGE BARRY, Jr.